United States Patent
Daniels et al.

(10) Patent No.: US 10,484,023 B2
(45) Date of Patent: Nov. 19, 2019

(54) WIRELESS SYSTEM AND METHODS FOR COEXISTENCE UNDER CONCURRENT USE OF SUB-7 GHZ AND MILLIMETER WAVE SPECTRUM

(71) Applicant: Phazr, Inc., Allen, TX (US)

(72) Inventors: Robert Clark Daniels, Austin, TX (US); Rakesh Taori, McKinney, TX (US); Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 16/147,193

(22) Filed: Sep. 28, 2018

(65) Prior Publication Data

US 2019/0103887 A1  Apr. 4, 2019

Related U.S. Application Data (60) Provisional application No. 62/567,177, filed on Oct. 2, 2017.

(51) Int. Cl.
| | | |
|---|---|---|
| *H04B 1/38* | (2015.01) | |
| *H04W 4/80* | (2018.01) | |
| *H04B 1/00* | (2006.01) | |

(52) U.S. Cl.
CPC ......... *H04B 1/0096* (2013.01); *H04B 1/0064* (2013.01)

(58) Field of Classification Search
CPC ...... H04B 1/0096; H04B 1/0064; H04B 1/38; H04B 1/40; H04W 4/80
See application file for complete search history.

(56) References Cited

U.S. PATENT DOCUMENTS

| | | | | |
|---|---|---|---|---|
| 5,940,750 | A * | 8/1999 | Wang | H01Q 1/247 |
| | | | | 455/318 |
| 8,755,450 | B2 * | 6/2014 | Kohda | H04L 1/12 |
| | | | | 375/259 |
| 9,973,367 | B2 * | 5/2018 | Gollakota | H04K 3/25 |
| 2011/0063169 | A1 * | 3/2011 | Chen | H01Q 3/267 |
| | | | | 342/368 |
| 2018/0035438 | A1 * | 2/2018 | Pao | H04W 72/0413 |
| 2018/0366347 | A1 * | 12/2018 | Chuang | H01L 23/5389 |
| 2019/0011925 | A1 * | 1/2019 | Bansal | G05D 1/0214 |
| 2019/0081596 | A1 * | 3/2019 | Dunworth | H01Q 5/335 |
| 2019/0103653 | A1 * | 4/2019 | Jeong | H01L 23/28 |
| 2019/0104131 | A1 * | 4/2019 | Reis | H04L 63/107 |

* cited by examiner

*Primary Examiner* — Andrew Wendell
(74) *Attorney, Agent, or Firm* — Michael A. Rahman (57) ABSTRACT

Systems and methods enable wireless devices to measure interference and allow coexistence by preventing transmission on bands that are currently in use by other devices.

3 Claims, 10 Drawing Sheets

WIRELESS SYSTEM AND METHODS FOR COEXISTENCE UNDER CONCURRENT USE OF SUB-7 GHZ AND MILLIMETER WAVE SPECTRUM

RELATED APPLICATION

This application claims priority to a Provisional Patent Application No. 62/567,177 filed Oct. 2, 2017 and entitled "Wireless System and Methods for Coexistence Under Concurrent Use of Sub-7 GHz and Millimeter Wave Spectrum" which is hereby incorporated by reference in its entirety.

BACKGROUND

The invention relates to wireless systems and methods using Sub-7 GHz spectrum and Millimeter wave spectrum on the same wireless communications link.

Description of the Related Art

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. To address the continuously growing wireless capacity challenge, the next generation of LAN and WAN systems are relying on higher frequencies referred to as millimeter waves in addition to currently used frequency bands below 7 GHz. The next generation of wireless WAN standard referred to as New Radio (NR) is under development in the Third Generation Partnership Project (3GPP). The 3GPP NR standard supports both Sub-7 GHz frequencies as well as millimeter wave bands above 24 GHz. Table 1 provides examples of millimeter wave bands.

TABLE 1

Examples of millimeter wave bands

| Bands [GHz] | Frequency [GHz] | Bandwidth [GHz] |
| --- | --- | --- |
| 24 GHz Bands | 24.25-24.45 | 0.200 |
|  | 25.05-25.25 | 0.200 |
| LMDS Band | 27.5-28.35 | 0.850 |
|  | 29.1-29.25 | 0.150 |
|  | 31-31.3 | 0.300 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

On Aug. 2, 2017, FCC issued a Notice of Inquiry to seek input on opening up new spectrum in the Sub-7 GHz band of 3.7-4.2 GHz. In this Notice of Inquiry, FCC also included 5.925-6.425 GHz; and 6.425-7.125 GHz bands. We collectively refer to the Sub-7 GHz spectrum and 5.925-6.425 GHz and 6.425-7.125 GHz bands as Sub-7 GHz spectrum.

DETAILED DESCRIPTION

Prior art systems provide two categories of wireless devices for communication. In one category, devices transmit on a millimeter wave spectrum band and receive on the Sub-7 GHz band. In the other category, devices receive on a millimeter wave spectrum band and transmit on the Sub-7 GHz band. Using these two categories of wireless devices allows a system to leverage the large spectrum resources in millimeter wave communication in asymmetric links where high bandwidth communication is more critical in one direction. This asymmetry is reinforced by constraints that practical millimeter wave communication requires more resources at the transmitter in terms of power and cost. Both of these categories of devices in prior art are unable to receive signals on the band they use for transmission.

Various aspects of the present disclosure are directed to systems and methods which enable devices to measure interference and allow coexistence by preventing transmission on bands that are currently in use by other devices.

Figure 1:
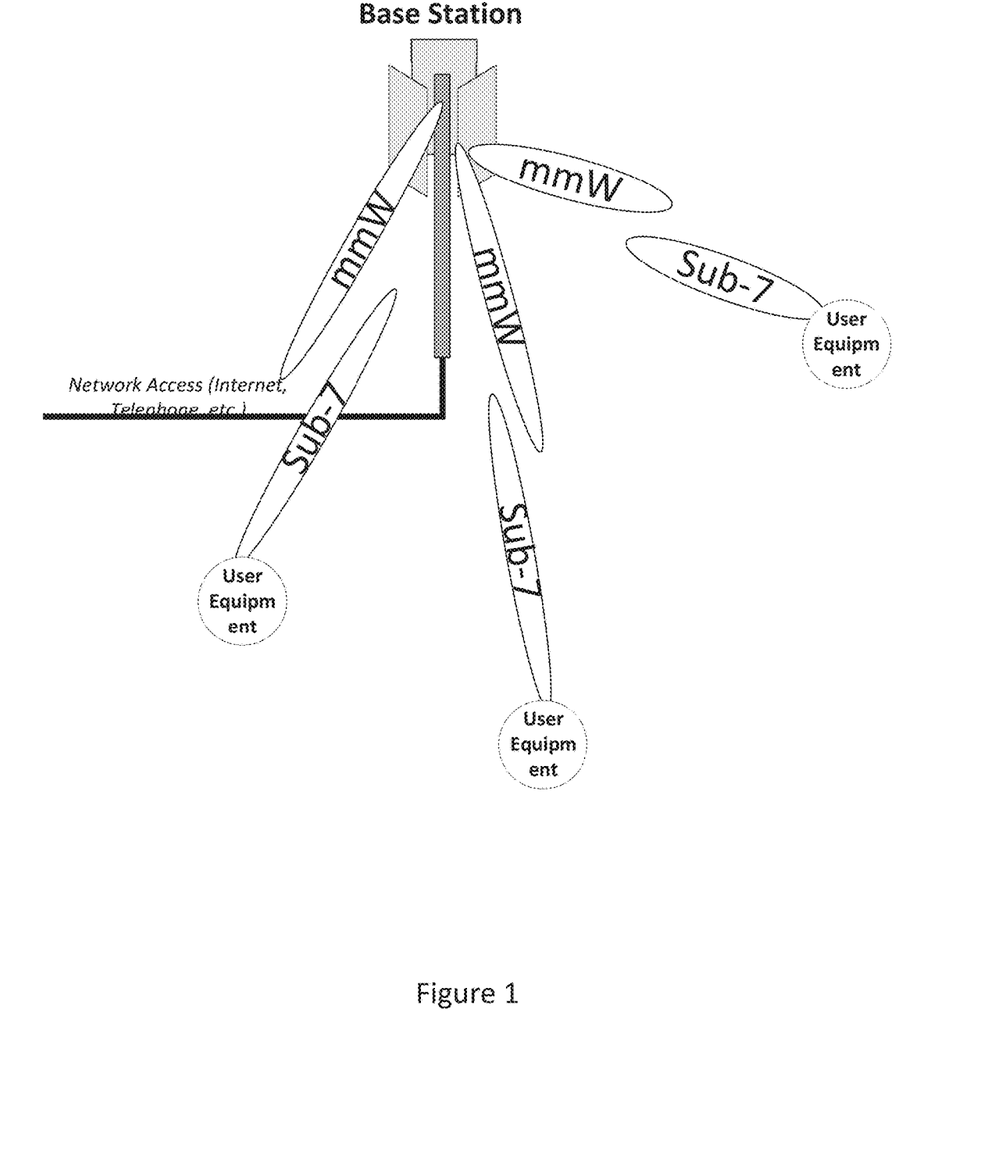
FIG. 1 illustrates an exemplary wireless system in accordance with disclosed embodiments.

In an embodiment of the present disclosure illustrated in FIG. 1, a cellular system includes a base station in the form of a Category A device and user equipment in the form of Category B devices.

In prior art, the implementation of Category A devices would not provision for reception of signals in the millimeter wave band. Since Category A devices transmit in the millimeter wave band, the ability of Category A devices with prior-art implementations to coexist with other devices that transmit the same millimeter wave band is limited. Similarly, the ability of Category B devices with prior-art implementations to coexist with other devices that transmit in the Sub-7 GHz band is limited. The disclosed embodiments provide implementations that improve coexistence ability by adding reception capabilities beyond prior art.

Figure 2:
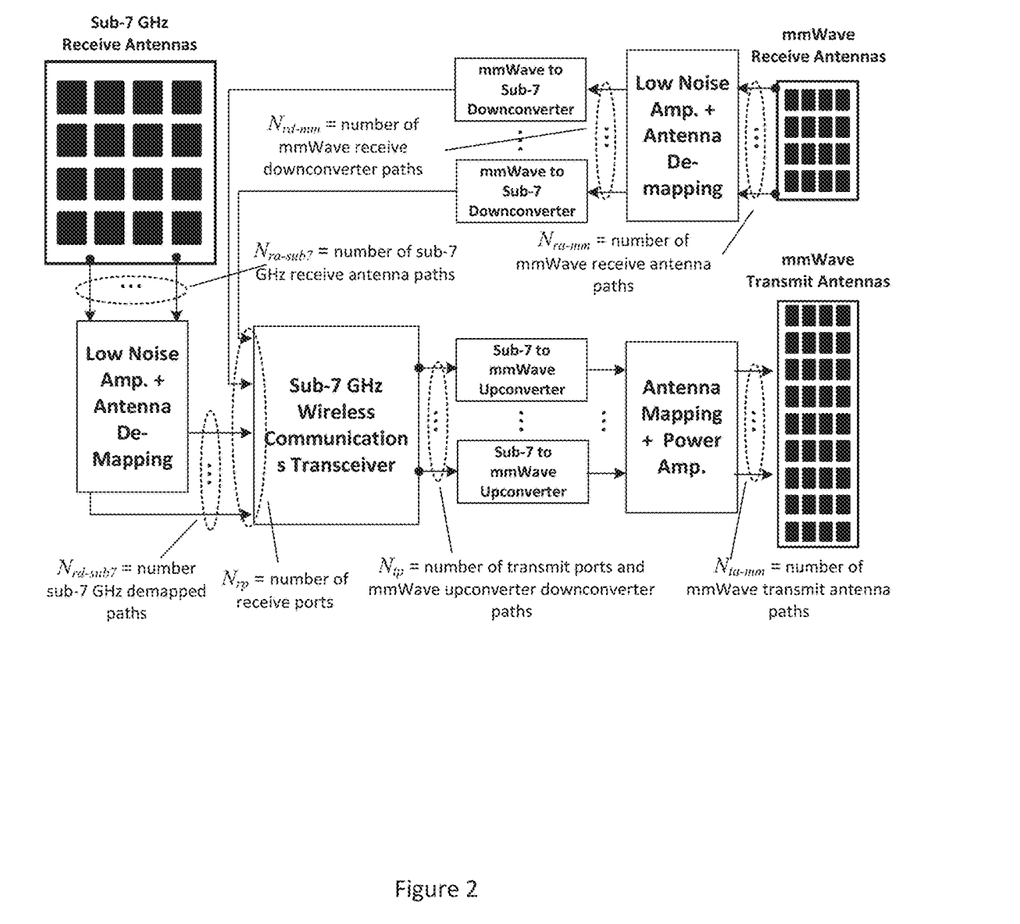
FIG. 2 illustrates an exemplary communication transceiver, where the transmit antennas are always dedicated to millimeter wave communication and there are separate receive antennas dedicated to millimeter wave communication and Sub-7 GHz communication, respectively.

According to disclosed embodiments, each link between Category A and Category B devices includes additional system components to measure other occupants of the spectrum, which may occur from other links within the system or any other devices outside the system that occupy the same Sub-7 GHz or millimeter wave bands of the system. FIG. 2 shows the additional system components which are needed by Category A devices if interference shall be measured in the millimeter wave band by the Category A device.

According to disclosed embodiments, the core element in Category A and Category B devices is a Sub-7 GHz Wireless Communications Transceiver with $N_{tp}$ signal ports allocated to the transmitter and $N_{rp}$ signal ports allocated to the receiver. One example of the Sub-7 GHz Wireless Communications Transceiver is a commercially-available IEEE 802.11ac standard-compliant WiFi system on a chip (SoC) with $N_{tp}=N_{rp}=4$, where all transmit and receive ports service the 5 GHz unlicensed band. Another example of the Sub-7 GHz Wireless Communications Transceiver is a commercially-available IEEE 802.11ac standard-compliant WiFi baseband combined with 5 GHz radio frequency (RF) integrated circuits to provide $N_{tp}=N_{rp}=4$, where all transmit and receive ports service the 5 GHz unlicensed band.

According to disclosed embodiments, Category A devices convert all Sub-7 GHz transmit ports from the Wireless Communication Transceiver to the millimeter wave band through various processing stages. These stages are broken down into three processes in FIG. 2: Upconversion, Antenna Mapping, and Power Amplification. In the Upconversion stage, all $N_{tp}$ analog transmit signals from the transceiver are separately upconverted to the desired millimeter wave band. Examples of sub-components in this Upconversion process include: local oscillator (LO) generation through a phase-locked loop (PLL), a mixer to take the analog product of the LO and the Sub-7 GHz transmit signal, and amplifiers to boost signal energy/reduce noise contributions. The Upconversion process may also include filters to remove undesired signal components in the Sub-7 GHz transmit signal before Upconversion, the LO signal, and the millimeter wave signal after Upconversion. The Antenna Mapping process translates $N_{tp}$ upconverted analog millimeter wave signals into $N_{ta-mm}$ analog millimeter wave signals for the transmit antennas. Examples of sub-components in this Antenna Mapping process include phase shifters, power combiners/splitters to increase/decrease the signal path dimensionality, amplifiers, or filters to remove signal components out of the millimeter wave band. The Power Amplification process is the final processing stage before the millimeter wave transmit antennas. The intent of this stage is to maximize the signal power in the context of regulatory constraints in the millimeter wave band and performance constraints of the system.

Of the $N_{rp}$ receive ports on Category A devices, $N_{rd-mm}$ are dedicated to millimeter wave spectrum and $N_{rd-sub7}$ are dedicated to Sub-7 GHz spectrum (i.e., $N_{rp}=N_{rd-sub7}+N_{rd-mm}$). The receive ports dedicated to Sub-7 GHz spectrum, which are intended to service the communication link, go through low noise amplification and antenna de-mapping stages after being received on the Sub-7 GHz antenna. Low noise amplification (LNA), which is intended to boost signal energy and prevent sensitivity to high noise figures in later processing stages, is the first stage of processing after the antennas. After the LNA, antenna de-mapping translates the $N_{ra-sub7}$ Sub-7 GHz signals paths from the Sub-7 GHz receive antennas and through the LNAs, to $N_{rd-sub7}$ Sub-7 GHz signal paths which directly attach to receiver ports. Examples of sub-components in the Antenna Demapping process include phase shifters, power combiners/splitters, amplifiers, and filters. The receive ports that are dedicated to millimeter wave spectrum are intended to be used to evaluate interference conditions on the millimeter wave spectrum. The signals that arrive at these receive ports go through three stages: LNA, Antenna De-mapping, and Downconversion. The LNA and antenna de-mapping stages perform the same functions on the millimeter wave signals as the Sub-7 GHz signals. The Antenna De-mapping stage translates $N_{ra-mm}$ Sub-7 GHz signals paths from the millimeter wave receive antennas and through the LNAs to $N_{rd-mm}$ Sub-7 GHz signal paths. The Downcoversion process converts the $N_{rd-mm}$ signals in millimeter wave spectrum to signals in Sub-7 GHz spectrum. Subcomponents in the Downconversion process may include: LO generation through a PLL, a mixer to take the analog product of the LO and the Sub-7 GHz transmit signal, and amplifiers to boost signal energy/reduce noise contributions. The Downconversion process may also include filters to remove undesired signal components in the Sub-7 GHz receive signal after Downconversion, the LO signal, and/or the millimeter wave signal before Downconversion.

In certain embodiments of Category A devices, functional requirements may be reduced. For example, Antenna Mapping may provide a 1-to-1 mapping, PA stages may be removed, LNA stages may be removed, Antenna De-mapping may provide a 1-to-1 mapping, and millimeter wave receive functionality may be removed (i.e, $N_{ra-mm}=N_{rd-mm}=0$). Reduction of requirements on various components need not be related. For example, millimeter wave receive functionality may be removed, but PA stages are maintained.

Figure 3:
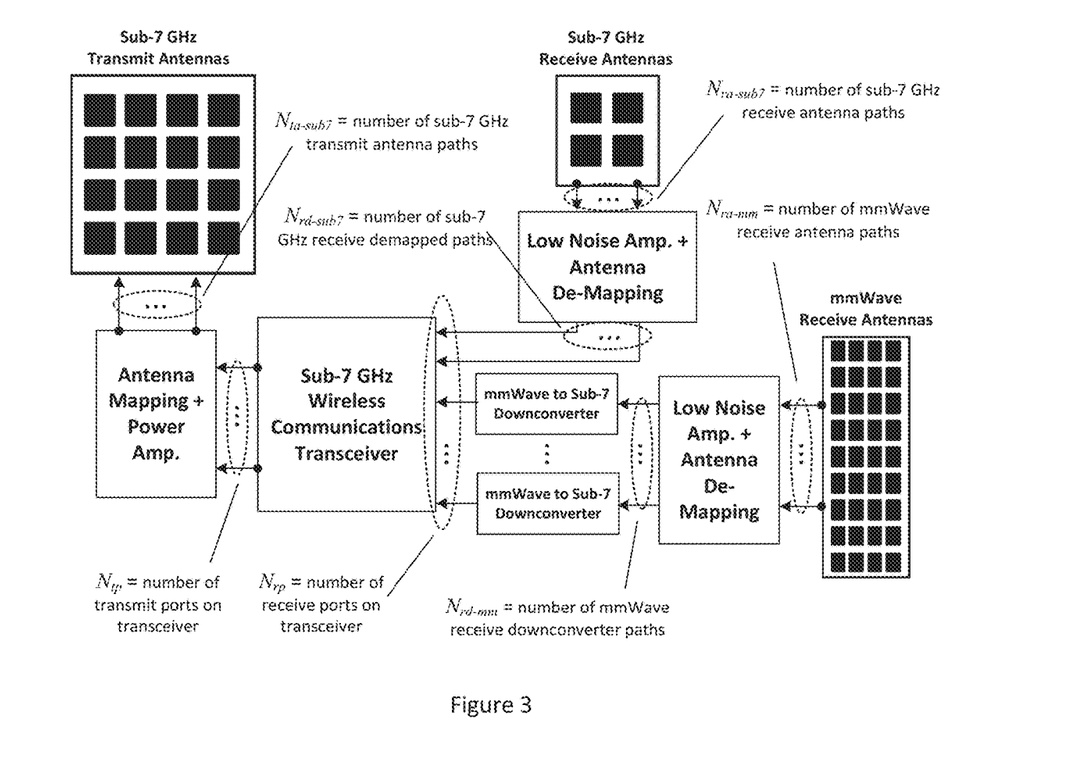
FIG. 3 illustrates an exemplary communication transceiver, where the receive antennas are always dedicated to millimeter wave communication and there are separate transmit antennas dedicated to millimeter wave communication and Sub-7 GHz communication, respectively.

FIG. 3 shows the additional system components which are needed by Category B devices if interference shall be measured in the Sub-7 GHz band by the Category B device.

According to disclosed embodiments, Category B devices connect all $N_{tp}$ transmit ports on the Wireless Communication Transceiver to all $N_{ta\text{-}sub7}$ ports on the antenna that services the Sub-7 GHz band through various processing stages. These transmission stages are broken down into two processes as illustrated in FIG. 3: Antenna Mapping and PA.

Of the $N_{rp}$ receive ports on Category B devices, $N_{rd\text{-}mm}$ are dedicated to millimeter wave spectrum and $N_{rd\text{-}sub7}$ are dedicated to Sub-7 GHz spectrum. The $N_{rd\text{-}mm}$ receive ports dedicated to millimeter wave spectrum are intended to service the millimeter wave communication link and service signals that have gone through three processing stages after the $N_{ra\text{-}mm}$ millimeter wave receive antennas: LNA, Antenna De-mapping, and Downconversion. The $N_{rd\text{-}sub7}$ receive ports that are dedicated to Sub-7 GHz spectrum are intended for interference measurements and service signals that are sourced from $N_{a\text{-}sub7}$ antenna ports on the Sub-7 GHz Receive Antennas and have gone through two processing stages: LNA and Antenna De-mapping.

In certain embodiments of Category B devices, functional requirements may be reduced. For example, Antenna Mapping may provide a 1-to-1 mapping, PA stages may be removed, LNA stages may be removed, Antenna De-mapping may provide a 1-to-1 mapping, and Sub-7 GHz receive functionality may be removed (i.e, $N_{ra\text{-}sub7}=N_{rd\text{-}sub7}=0$). Reduction of requirements of the various components need not be related. For example, Sub-7 GHz receive functionality may be removed, LNA stages are maintained.

Figure 4:
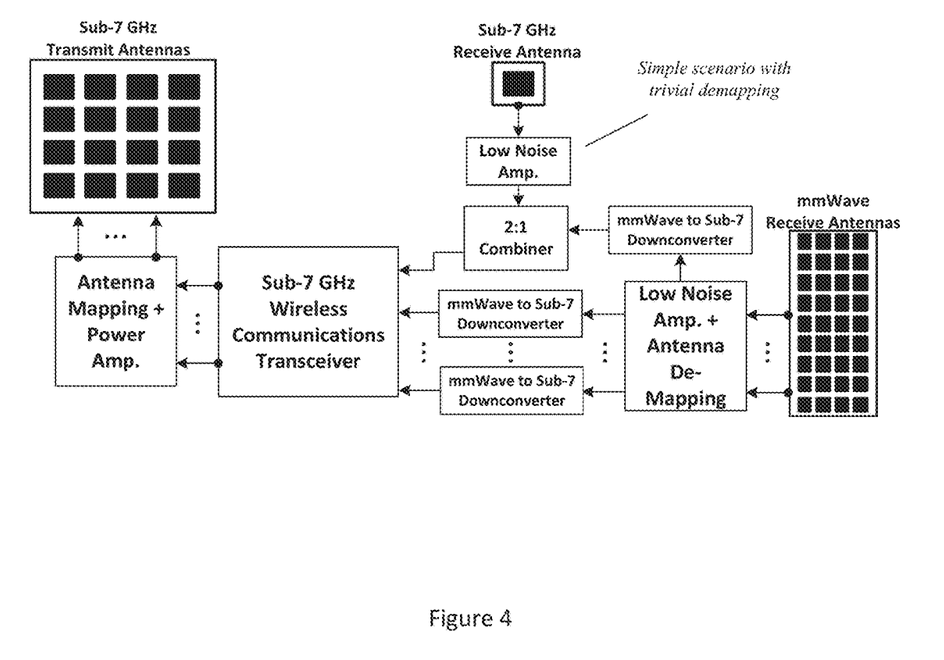
FIG. 4 illustrates an exemplary communication transceiver where a combiner is used to simultaneously accept signals on its receive ports from Sub-7 GHz antennas and millimeter wave antennas.

In certain embodiments of Category A and Category B devices, some receive ports on the Wireless Communication Transceiver may result from the combination of signals from millimeter wave spectrum and Sub-7 GHz spectrum. FIG. 4 illustrates the case where a Category B device combines the signal measured on a single Sub-7 GHz receive antenna with a signal extracted from millimeter wave receive antennas. The signal from the millimeter wave receive antennas goes through the LNA and Antenna De-mapping processes before it is converted. The 2:1 combiner operates on the Sub-7 GHz spectrum to combine the signal from both paths. The receiver port that is connected to the output of the 2:1 combiner can be used to simultaneously measure interference on the Sub-7 GHz spectrum and receive desired communications signals transmitted from Category A devices on the millimeter wave spectrum.

Figure 5:
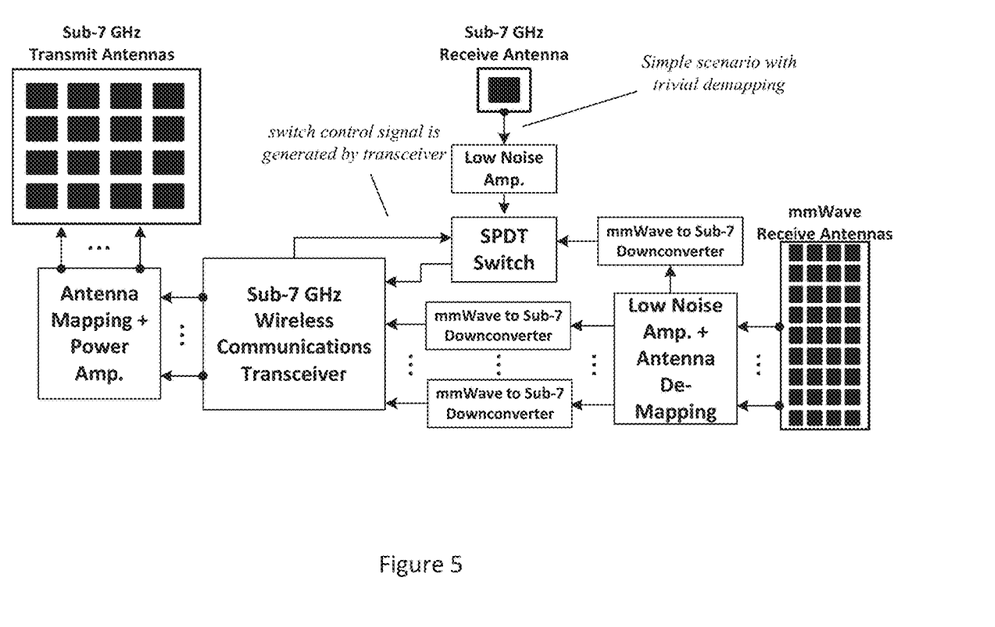
FIG. 5 illustrates an exemplary communication transceiver where a single-pull, double-throw (SPDT) switch is used to alternate between accepting and rejecting signals on its receive ports from Sub-7 GHz antennas.

In certain embodiments of Category A and Category B devices, some receive ports on the Wireless Communication Transceiver may switch between the millimeter wave spectrum and Sub-7 GHz spectrum. A receive port switches between a signal path from Sub-7 GHz spectrum and millimeter wave spectrum. FIG. 5 illustrates the case where a Category B device switches between a signal measured on a single Sub-7 GHz receive antenna and a signal extracted from millimeter wave receive antennas. The signal from the millimeter wave receive antennas goes through the LNA and Antenna De-mapping processes before it enters Downconversion. The single-pull, double throw (SPDT) switch operates on the Sub-7 GHz spectrum to select between both Sub-7 GHz and millimeter wave paths. The receiver port that is connected to the output of the SPDT switch can be used to measure interference on the Sub-7 GHz spectrum and receive desired communication signals on the millimeter wave spectrum that are transmitted from Category A devices. The switch control signal determines which signal path is received and is intended to be generated by the Wireless Communications Transceiver.

Figure 6:
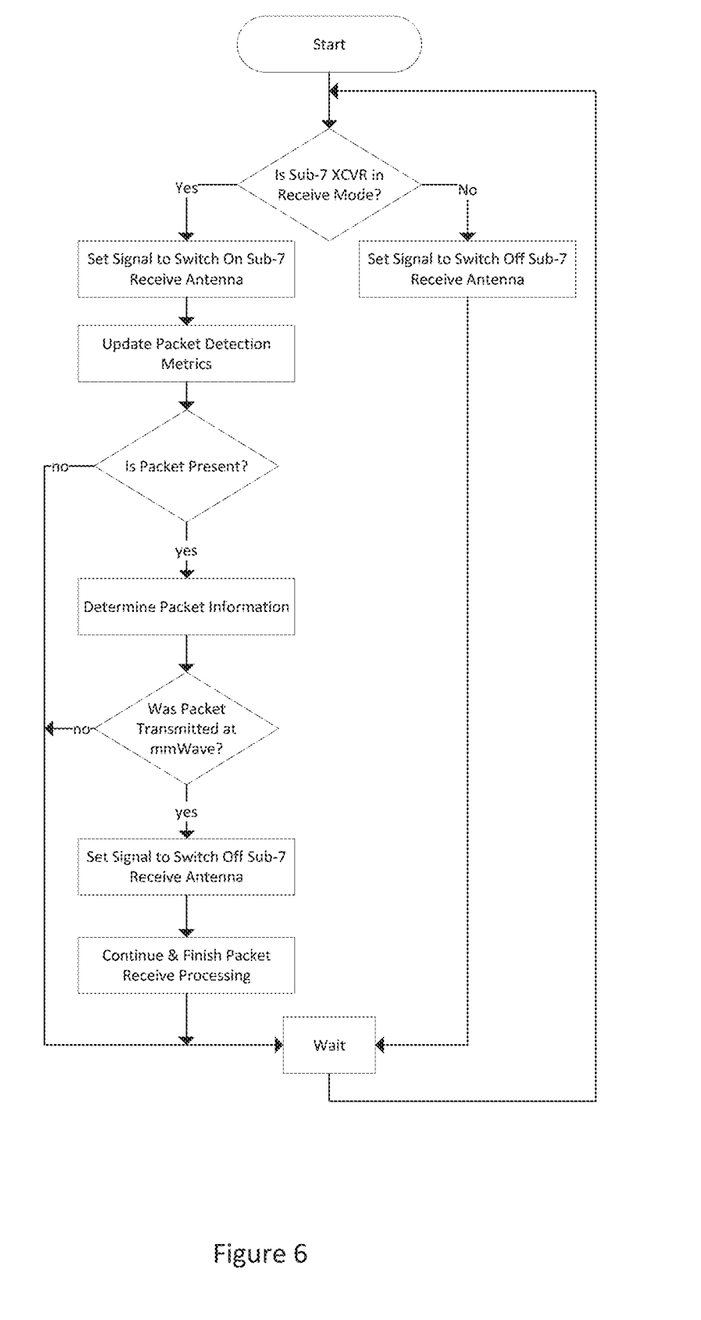
FIG. 6. is a flow diagram which demonstrates a method for generating the switch control signal, which is used to alternate between accepting signals from the millimeter wave and Sub-7 GHz antennas.

In certain embodiments, the switch control signal is generated based on the presence of communication signals from desired transmitters. FIG. 6 is a flow diagram of a method for providing the switch control signal.

Using the method from FIG. 6, the Wireless Communications Transceiver first determines whether it is in the process of transmitting. If transmission is occurring, the switch control signal will disconnect the Sub-7 GHz signal paths from the associated receive ports (which connects the remaining millimeter wave signal paths). If the Wireless Communications Transceiver is not transmitting, the switch control signal connects the Sub-7 GHz signal paths from the associated receive ports (which disconnects the remaining millimeter wave signal paths). Next, it is determined if a valid wireless communication packet has been received over the last interval of measurement. This can be assessed, for example, by monitoring the packet detection algorithm which measures the cross-correlation coefficient of training sequences found in the beginning of wireless packets. If a packet has not been found since the last time it was evaluated in the flow diagram, we wait a fixed period of time and return to the beginning of the flow diagram. If a packet has been found in the last interval of evaluation, we further inspect information about the packet. If the packet is coming from a millimeter wave transmitter, which can be assessed from information bearing fields in the beginning of the packet, the switch control signal will toggle to disconnect the Sub-7 GHz signal paths and connect the millimeter wave signal paths. Before taking any further steps, the Wireless Communication Transceiver is monitored until packet detection completes. When it does, we wait a fixed period of time and return to the beginning of the flow diagram.

In certain other embodiments of Category B device, two Sub-7 GHz Wireless Communications Transceivers are implemented. A first Sub-7 GHz Wireless Communications Transceiver, Transceiver 1, transmits and receives signals in the Sub-7 GHz band only, while the second Wireless Communications Transceiver, Transceiver 2, transmits signals in the Sub-7 GHz band while receiving signals in the millimeter wave band. In this type of Category B device, a receive port switches between a signal path from Sub-7 GHz spectrum and millimeter wave spectrum based on composite switch control signa based on the switch control signal from Transceiver 1 and the switch control signal from Transceiver 2.

Figure 7:
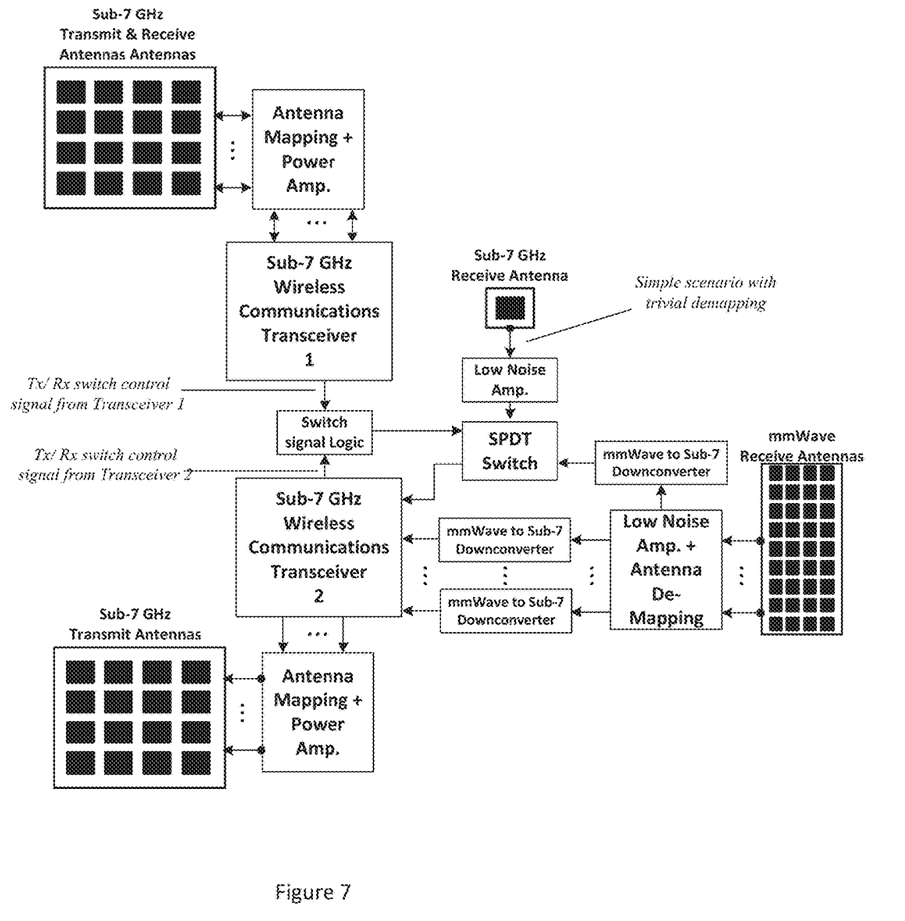
FIG. 7 illustrates an exemplary device where two Sub-7 GHz Wireless Communications Transceivers are implemented with a receive port on one of the Sub-7 GHz receivers that switches between a signal path from Sub-7 GHz spectrum and millimeter wave spectrum.

FIG. 7 illustrates the case where a Category B device switches between a signal measured on a single Sub-7 GHz receive antenna and a signal extracted from millimeter wave receive antennas based on the switch control signals from both Transceiver 1 and Transceiver 2. The signal from the millimeter wave receive antennas goes through the LNA and Antenna De-mapping processes before it enters Down conversion. The SPDT switch operates on the Sub-7 GHz spectrum to select between both Sub-7 GHz and millimeter wave paths. The receiver port that is connected to the output of the SPDT switch can be used to measure interference on the Sub-7 GHz spectrum and receive desired communication signals on the millimeter wave spectrum that are transmitted from Category A devices. A composite switch control signal derived based on the switch control signal from Transceiver 1 and switch control signal from Transceiver 2 determines which signal path is received. For example, when Transceiver 1 is transmitting while Transceiver 2 is receiving, the switch control logic will generate a switch signal that will select the millimeter wave down-converted path. This way, the Sub-7 GHz transmitted signal from Transceiver 1 will not be picked up by the Transceiver 2 while Transceiver 2 is receiving signal on the down-converted Millimeter wave path.

Figure 8:
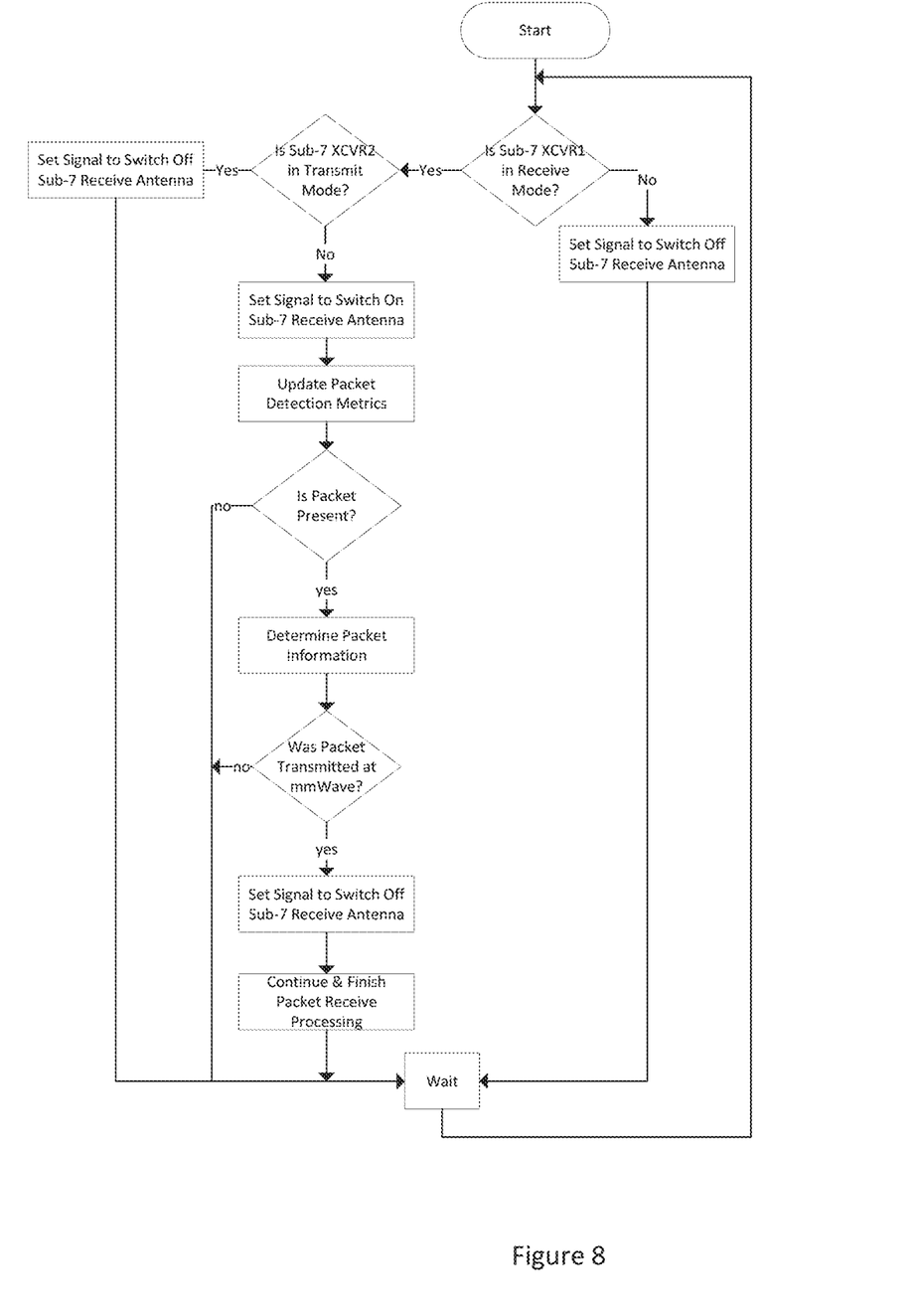
FIG. 8. is a flow diagram describing the flow for a method for generating switch control signal used for selecting the sub-7 GHz or mmW path.

In certain other embodiments, the switch control signal is generated based on the presence of communication signals from Transceiver 1 and Transceiver 2. FIG. 8 is a flow diagram of a method for providing the switch control signal for the case when the Category B device implements two or more Sub-7 GHz Wireless Communications Transceivers.

Using the method from FIG. 8, the Wireless Communications Transceiver 1 first determines whether it is in the process of transmitting. If transmission is occurring, the switch control signal will disconnect the Sub-7 GHz signal paths from the associated receive ports (which connects the remaining millimeter wave signal paths). If the Transceiver 1 is not transmitting and Transceiver 2 is transmitting, the switch control signal will disconnect the Sub-7 GHz signal paths from the associated receive ports (which connects the remaining millimeter wave signal paths). If Transceiver 1 is not transmitting and Transceiver 2 is not transmitting either, the switch control signal connects the Sub-7 GHz signal paths from the associated receive ports (which disconnects the remaining millimeter wave signal paths). Next, it is determined if a valid wireless communication packet has been received over the last interval of measurement. This can be assessed, for example, by monitoring the packet detection algorithm which measures the cross-correlation coefficient of training sequences found in the beginning of wireless packets. If a packet has not been found since the last time it was evaluated in the flow diagram, we wait a fixed period of time and return to the beginning of the flow diagram. If a packet has been found in the last interval of evaluation, we further inspect information about the packet. If the packet is coming from a millimeter wave transmitter, the switch control signal will toggle to disconnect the Sub-7 GHz signal paths and connect the millimeter wave signal paths. Before taking any further steps packet detection completes. When it does, we wait a fixed period of time and return to the beginning of the flow diagram.

Figure 9:
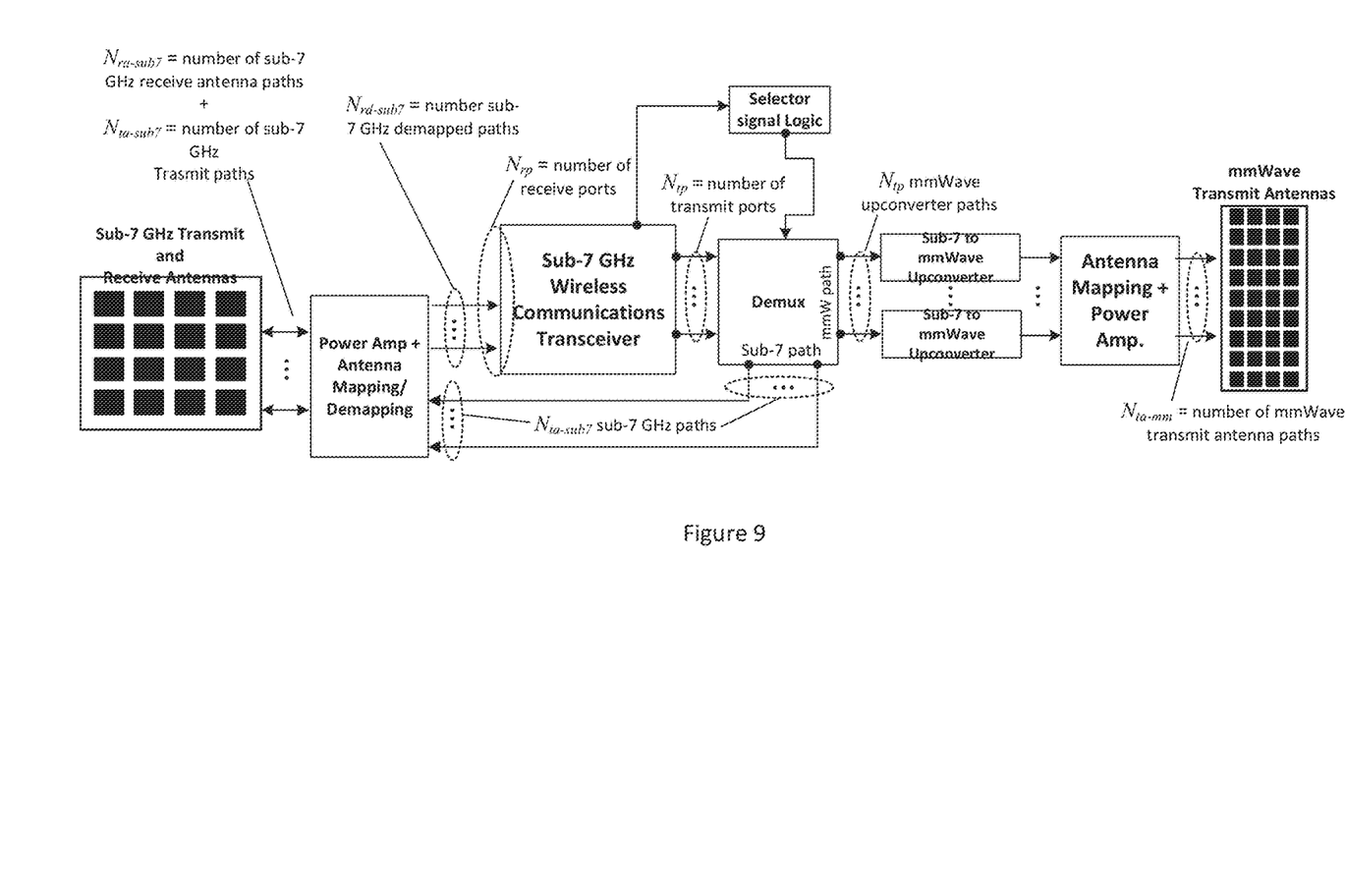
FIG. 9 illustrates an exemplary communication transceiver with a mmWave Transmitter and Sub-7 GHz transceiver and a means for directing the transmission either to the millimeter-wave antenna or the Sub-7 GHz antenna using a selector signal.

FIG. 9 illustrates an embodiment of a Category A device where transmission is directed either to the millimeter-wave antenna or the Sub-7 GHz antenna paths by means of selector signal. Thus, the Category A device includes a mmWave Transmitter and Sub-7 GHz transceiver with a means for directing the transmission either to the millimeter-wave antenna or the Sub-7 GHz antenna paths by means of selector signal. The selector signal controls a de-muxing device which will direct the $N_{tp}$ transmit signals to the Sub-7 GHz path, i.e. through the Sub-7 GHz Power amplifier and the Sub-7 GHz antenna mapping process prior to being transmitted on the Sub-7 GHz antenna, OR it will direct the $N_{tp}$ transmit signals through the upconverters, power amplifiers, and antenna mapping prior to connecting to the millimeter wave antenna. The selector signal is used to prevent interference. For example, a Category A device can protect a responding message that will be sent by a Category B device in response to an initial message from the Category A device by preventing interference from other transmitters in the Sub-7 GHz band. Such interference can be caused by another occupant of the Sub-7 GHz band (not necessarily communicating with the category A device) that may initiate a transmission during an ongoing millimeter wave transmission from Category A to a Category B device. The said Sub-7 GHz transmission may continue well beyond the transmission of the millimeter wave initial message from Category A device to Category B, causing severe interfere with the responding message transmitted by Category B device to Category A device. To avoid such interference on the Sub-7 GHz band, the Category A device first sends a channel reservation message on the Sub-7 GHz band to cause the band to be reserved for the duration of the initial message from Category A to Category B device and the corresponding responding message from the Category B device back to Category A device. In this way, the Sub-7 GHz responding message can be successfully received by the Category A device without interference or loss of the responding message. Once the channel reservation message is sent, the selector signal causes the $N_{tp}$ signals to be directed to the millimeter wave path for the transmission of the initial message. Note that the Category A device does not transmit the channel reservation message if it is responding to any message from any category B device, but only when a new message transaction is initiated by the Category A device.

The channel reservation message can be similar to a CTS-to-Self frame used in IEEE 802.11 systems, wherein the duration field can be set to cover the duration of the data and the ACK frames.

Figure 10:
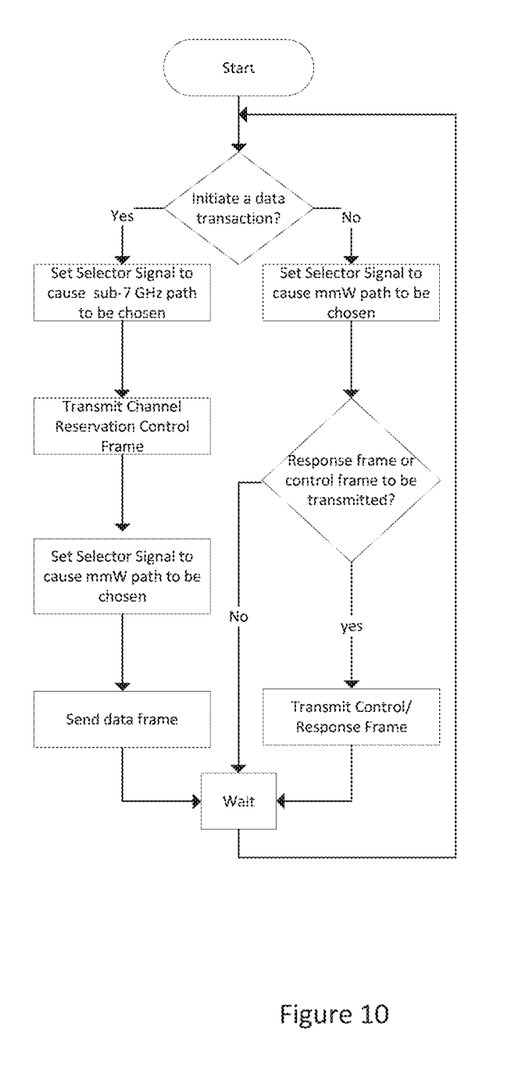
FIG. 10. is a flow diagram which demonstrates a method for generating the selector signal, which is used to direct the transmission either to the millimeter-wave antenna or the Sub-7 GHz antenna.

In the context of IEEE 802.11 or similar standard systems, the selector signal logic is implemented in accordance with the flow diagram shown in FIG. 10 for the case that a Category A device implements the de-muxing device.

To support Category B devices that do not have the Sub-7 GHz single antenna receiver, an embodiment of Category A device is envisaged that performs clear channel assessment on behalf of, or in lieu of the Category B device. Two mechanisms are disclosed:

a. A first mechanism involves the Category A device performing a clear channel assessment on the Sub-7 GHz channel using the very high receive gain Sub-7 GHz antenna; determining whether the channel is busy; and transmitting a control frame on the mmWave channel informing the Category B receivers to refrain from initiating transmissions for a certain duration of time, if the channel was determined as busy. The duration for which the transmissions are prohibited is determined based either on decoding of the packet-length fields in the packets that were received over the air during the clear channel assessment phase or a preset fixed value. The control frame will be a broadcast frame.

b. A second mechanism involves the category A device to refrain from responding to a data or control frame from a category B device if the category A device detects that the Sub-7 GHz channel on which the MAC frames are received is not free.

The invention claimed is:

1. A wireless communications system, comprising:
a first device configured to transmit signals in millimeter wave spectrum and receive signals in both millimeter wave spectrum and Sub-7 GHz spectrum, wherein millimeter wave and Sub-7 GHz receive antenna paths of the first device are combined into same receive ports through a first power combiner;
a second device configured to transmit signals in Sub-7 GHz spectrum and receive signals in both Sub-7 GHz spectrum and millimeter wave spectrum, wherein millimeter wave and Sub-7 GHz receive antenna paths of the second device are combined into same receive ports through a second power combiner,
wherein the second device includes a sub-7 GHz transceiver where a receive port switches between a signal path from Sub-7 GHz spectrum and millimeter wave spectrum based on a composite switch control signal derived from transmit/receive status of a plurality of transceivers.

2. The system of claim 1, wherein the first and the second device comprise respective first and second switch configured to switch between the millimeter wave and Sub-7 GHz receive antenna paths on the same receive ports.

3. The system of claim 1, wherein the first and the second device are connected to the millimeter wave and the sub-7 GHz receive antenna paths based on information embedded in the received communication signals.

* * * * *